J. H. MOSS.
Vehicle-Wheel.
No. 199,563. Patented Jan. 22, 1878.
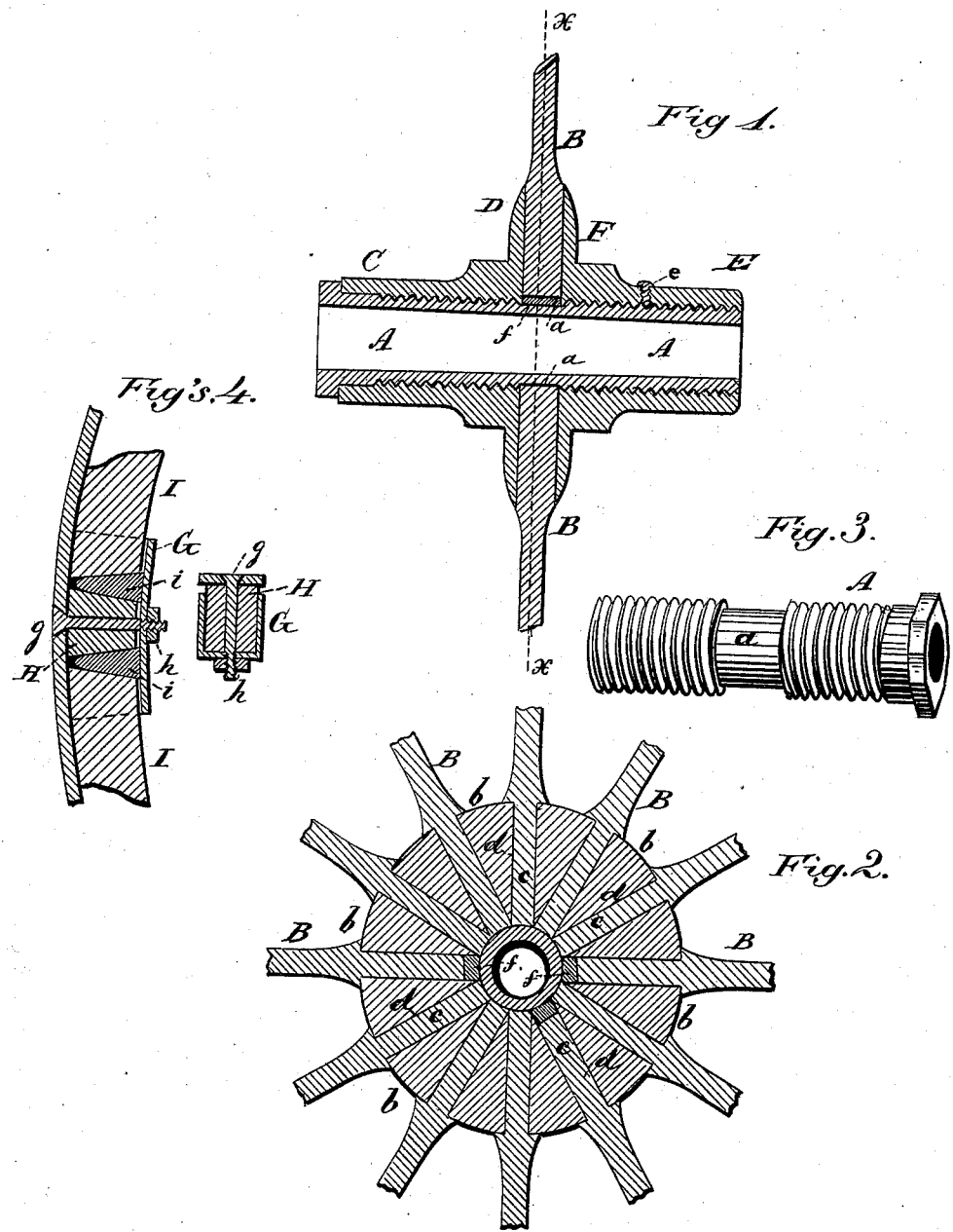

UNITED STATES PATENT OFFICE.

JOHN H. MOSS, OF COLLIERSVILLE, TENNESSEE, ASSIGNOR OF ONE-HALF HIS RIGHT TO BOYD C. BLEDSOE, OF SAME PLACE.

IMPROVEMENT IN VEHICLE-WHEELS.

Specification forming part of Letters Patent No. 199,563, dated January 22, 1878; application filed November 6, 1877.

*To all whom it may concern:*

Be it known that I, JOHN H. MOSS, of Colliersville, in the county of Shelby and State of Tennessee, have invented certain new and useful Improvements in Vehicle-Wheels; and I do hereby declare that the following is a full, clear, and exact description thereof, which will enable others skilled in the art to which it appertains to make and use the same, reference being had to the accompanying drawings, which form a part of this specification, and in which—

Figure 1 is a sectional view of my improved hub. Fig. 2 is a cross-section on the line $x\ x$ in Fig. 1. Fig. 3 is a perspective view of the screw-boxing, detached from the wheel; and Fig. 4 is a segment of the wheel, showing the construction and application of my improved tire-tightener.

Similar letters of reference indicate corresponding parts in all the figures.

My invention relates to improvements in vehicle-wheels; and it consists in an improved construction, arrangement, and combination of parts, substantially as hereinafter described.

In the drawing, A is the axle-box, which is tapering inside but cylindrical outside, and provided with a screw-thread. The central or middle portion of this screw-thread is partially cut away, as shown at $a$, to form a seat for the tenons of the spokes B, which abut against it.

Upon box A is screwed the sleeve C, cast in one piece with which is the hub-plate D. The latter has upon its face a series of radiating recesses, $d$, for the insertion of the spoke-tenons $c$, the recesses $d$ being separated from each other by wedge-shaped walls or partitions $h$.

E is another sleeve, having a face-plate, F, of the same diameter as D, so that when sleeve E is screwed upon the boxing A plate F will bear against the sides of the spoke-tenons. Sleeve E is secured in its place upon the boxing, and prevented from working off, by a screw, $e$, as shown in Fig. 1.

From the foregoing description, this part of my invention will be readily understood. Sleeve C and plate D, having been screwed home upon the boxing, the spoke-tenons are inserted sidewise into the mortises $d$, which may be dovetailed in shape, and larger toward the center of the plate than at the periphery. If any of the spokes should be too short this may easily be remedied by inserting the short wedges or keys $f$ between the boxing and the end of the tenon. All the tenons having been properly inserted, sleeve E, with plate F, is screwed upon box A until it clamps the spokes firmly, when it is secured in place by the insertion of the screw $e$.

The second part of my invention relates to an improvement in the device for tightening the tire upon the fellies. This consists of a cap or band, G, of a width corresponding to the width of the fellies, and held in place upon a bolt, $g$, the head of which is countersunk in the tire by a jam-nut, $h$. This cap works against two wedges, $i\ i$, which are inserted, one on each side of a short felly, H, so that by tightening the nut $h$ the wedges $i\ i$ will be forced in between the felly H and the fellies I I, next to it, thereby expanding the rim of the wheel and tightening the tire. The flanges of cap G, which lie close up against the fellies, prevent the cap from turning, so that this will always be flush and even with the rim of the wheel.

Having thus described my invention, I claim and desire to secure by Letters Patent of the United States—

1. The improved wheel for vehicles, herein shown and described, consisting of the cylindrical screw-threaded axle-box A, having central blank section $a$, screw-threaded sleeve C, cast in one piece with face-plate D, having recesses $d$, sleeve E cast in one piece with the clamp-plate F, set-screw $e$, tightening-wedges $f$, and spokes B, all constructed and combined, substantially as and for the purpose set forth.

2. As an improvement in tire-tighteners, the double wedge $i\ i$, with its operating-cap G, bolt $g$, and jam-nut $h$, in combination with the central stationary block H and fellies I I, substantially as and for the purpose shown and set forth.

In testimony that I claim the foregoing as my own I have hereto affixed my signature in presence of two witnesses.

JOHN H. MOSS.

Witnesses:
 GEO. W. SCOTT,
 W. J. COOPWARD, Jr.